(12) United States Patent
Meseth

(10) Patent No.: US 7,680,237 B1
(45) Date of Patent: Mar. 16, 2010

(54) CONTAINMENT VESSEL AND METHOD OF OPERATING A CONDENSER IN A NUCLEAR POWER PLANT

(75) Inventor: Johann Meseth, Dieburg (DE)

(73) Assignee: Areva NP GmbH, Erlangen (DE)

(*) Notice: Subject to any disclaimer, the term of this patent is extended or adjusted under 35 U.S.C. 154(b) by 0 days.

(21) Appl. No.: 09/655,091

(22) Filed: Sep. 5, 2000

Related U.S. Application Data

(63) Continuation of application No. PCT/DE99/00447, filed on Feb. 18, 1999.

(30) Foreign Application Priority Data

Mar. 3, 1998 (DE) .................... 198 09 000

(51) Int. Cl.
*G21C 9/00* (2006.01)
(52) U.S. Cl. ............... 376/283; 376/299; 376/293; 376/277
(58) Field of Classification Search .......... 376/283, 376/298, 299, 293, 277
See application file for complete search history.

(56) References Cited

U.S. PATENT DOCUMENTS

| | | | | |
|---|---|---|---|---|
| 3,115,450 | A * | 12/1963 | Schanz | 376/283 |
| 4,022,655 | A * | 5/1977 | Gaouditz et al. | 376/283 |
| 4,511,376 | A * | 4/1985 | Coury | 95/256 |
| 5,008,069 | A * | 4/1991 | Fredell | 376/299 |
| 5,059,385 | A * | 10/1991 | Gluntz et al. | 376/282 |
| 5,082,619 | A | 1/1992 | Sawyer | 376/298 |
| 5,102,617 | A | 4/1992 | Gluntz et al. | 376/298 |
| 5,106,571 | A * | 4/1992 | Wade et al. | 376/283 |
| 5,126,099 | A * | 6/1992 | Van Kuijk | 376/283 |
| 5,149,492 | A | 9/1992 | Arai et al. | 376/298 |
| 5,169,595 | A * | 12/1992 | Cooke | 376/282 |
| 5,282,230 | A * | 1/1994 | Billig et al. | 376/283 |
| 5,295,168 | A * | 3/1994 | Gluntz et al. | 376/283 |
| 5,303,274 | A * | 4/1994 | Sawyer | 376/283 |

(Continued)

FOREIGN PATENT DOCUMENTS

EP    0 492 899 A1    7/1992    .............. 376/298

(Continued)

OTHER PUBLICATIONS

Brettschuh et al. ("SWR-1000—der Siedewasserreaktor der Zukunft", Siemens Power Journal, Feb. 1996) , English language translation.*

(Continued)

*Primary Examiner*—Rick Palabrica
(74) *Attorney, Agent, or Firm*—Laurence A. Greenberg; Werner H. Stemer; Ralph E. Locher

(57) ABSTRACT

A containment vessel of a boiling-water nuclear power plant and a method of operating a condenser in a nuclear power plant, include a drain pipe which connects a top region of the containment vessel to a condensing chamber disposed in the containment vessel. The drain pipe draws off noncondensible gases from the surroundings of a building condenser in the containment vessel and thus maintains reliability of performance of the building condenser. The noncondensible gases flow automatically into the condensing chamber through the drain pipe. As a result, the building condenser may have a simple and cost-effective structure.

10 Claims, 1 Drawing Sheet

U.S. PATENT DOCUMENTS

| | | | | |
|---|---|---|---|---|
| 5,353,318 | A | * | 10/1994 | Gluntz .................. 376/283 |
| 5,377,243 | A | * | 12/1994 | Hill ..................... 376/283 |
| 5,570,401 | A | | 10/1996 | Gluntz .................. 376/298 |
| 5,596,613 | A | * | 1/1997 | Gluntz et al. ............ 376/283 |
| 5,642,389 | A | | 6/1997 | Mattern et al. ........... 376/298 |
| 5,694,442 | A | | 12/1997 | Cinotti et al. |
| 6,069,930 | A | * | 5/2000 | Gamble et al. ............ 376/282 |
| 6,243,432 | B1 | * | 6/2001 | Cheung et al. ............ 376/283 |
| 6,249,561 | B1 | * | 6/2001 | Aburomia ................ 376/283 |
| 6,285,727 | B1 | * | 9/2001 | Bredolt et al. ............ 376/282 |
| 6,618,461 | B2 | * | 9/2003 | Cheung et al. ............ 376/283 |
| 2002/0122526 | A1 | * | 9/2002 | Hidaka et al. ............ 376/283 |

FOREIGN PATENT DOCUMENTS

| | | | | |
|---|---|---|---|---|
| EP | 596703 | * | 5/1994 | ............... 376/283 |
| EP | 0 620 560 | A1 | 10/1994 | ............... 376/298 |
| EP | 0 677 851 | A1 | 10/1995 | ............... 376/298 |
| EP | 0 681 300 | A1 | 11/1995 | ............... 376/298 |
| FR | 1359961 | * | 5/1963 | ............... 376/283 |
| JP | 62-108939 | * | 5/1989 | ............... 376/293 |
| JP | 05-196776 | * | 8/1993 | ............... 376/293 |
| JP | 6130170 | A | 5/1994 | |
| JP | 6214082 | A | 8/1994 | |
| JP | 9508700 | A | 9/1997 | |

OTHER PUBLICATIONS

Japanese Patent Abstract No. 05034484 (Hideo), dated Feb. 9, 1993.
Japanese Patent Abstract No. 08211181 (Yoshiyuki), dated Aug. 20, 1996.
Japanese Patent Abstract No. 07128482 (Toshimi), dated May 19, 1995.
Japanese Patent Abstract No. 06222182 (Kenji), dated Aug. 12, 1994.
"SWR 1000—der Siedewasserreaktor der Zukunft" (Brettschuh et al.), Siemens Power Journal Feb. 1996, pp. 18-22, as mentioned on p. 2 of the specification, pertains to the boiling water reactor of the future.

* cited by examiner

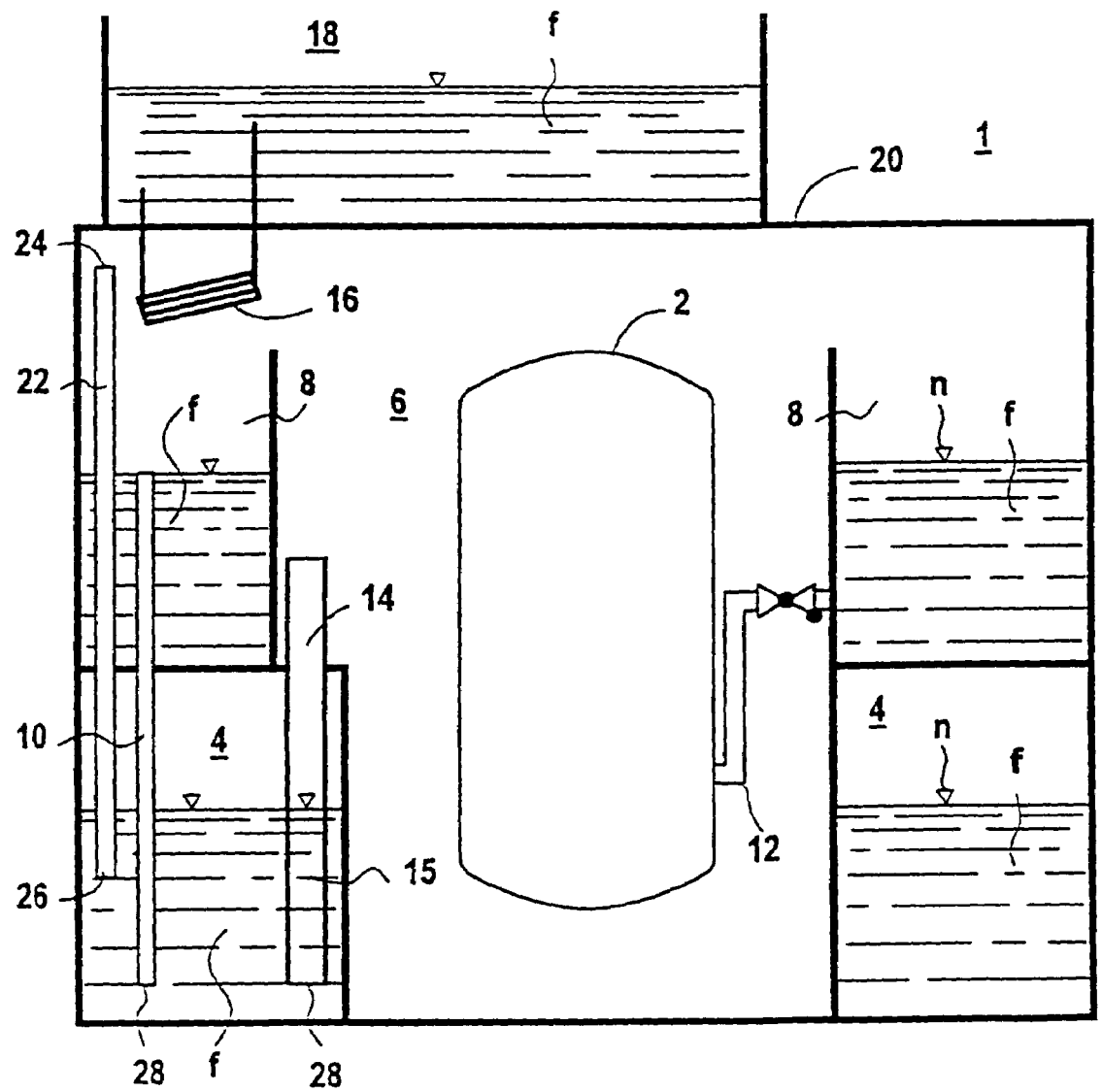

CONTAINMENT VESSEL AND METHOD OF OPERATING A CONDENSER IN A NUCLEAR POWER PLANT

CROSS-REFERENCE TO RELATED APPLICATION

This application is a continuation of copending International Application No. PCT/DE99/00447, filed Feb. 18, 1999, which designated the United States.

BACKGROUND OF THE INVENTION

Field of the Invention

The present invention relates to a containment vessel of a nuclear power plant, having a condensing chamber, a pressure chamber and a condenser disposed in a top region of the pressure chamber. The invention also relates to a method of operating a condenser in a nuclear power plant.

Modern safety concepts of nuclear power plants are conceived with the aim that, in the event of accidents, the effects on the nuclear power plant will be limited and the environment will not be contaminated. An important point in that respect is that sufficient cooling of important components of the nuclear power plant be ensured in every operating situation. In order to increase safety, emergency cooling devices provided for cooling are generally constructed as passive components which are operable independently of external power sources and solely on the basis of laws of physics.

An article entitled "SWR 1000—Der Siedewasserreaktor der Zukunft" [SWR 1000—The Boiling Water Reactor of the Future], Siemens Power Journal, pages 18 to 22, February 1996, Siemens AG, Germany, Order No. A96001-U90-A314, discloses an innovative construction and safety concept for a boiling water reactor. In the boiling water reactor described therein, the reactor pressure vessel is disposed centrally in a containment vessel, known as the containment. In order to provide for the emergency cooling of the boiling water reactor, a closed-off condensing chamber and a flood basin disposed above it are provided in an interior space of the containment vessel. The flood basin is open toward a central region in which the reactor pressure vessel is disposed. The flood basin forms a pressure chamber with the central region. A so-called building condenser is disposed above the flood basin, i.e. in the top region of the pressure chamber or of the containment vessel. The building condenser is connected to a cooling liquid of a cooling basin disposed above the containment vessel and serves to dissipate heat from the pressure chamber.

The efficiency of the building condenser reacts in a sensitive manner to the presence of noncondensible gases, such as nitrogen or hydrogen, in which case the latter in particular may be produced in the event of serious accidents. That is because the noncondensible gases reduce the capacity of the building condenser to dissipate heat from any steam present in the pressure chamber into the cooling basin. Hydrogen accumulates in the top region of the pressure chamber due to its low specific weight, so that a high concentration of noncondensible gases may be present precisely in the surroundings of the building condenser. The high concentration leads to a pressure increase in the containment vessel in that case, due to the deficient heat dissipation through the building condenser.

In order to dissipate heat from the pressure chamber in the event of an accident, concepts are known in which the pressure chamber is connected through a flow path to a condenser that is disposed in a cooling basin which is located, for example, on the containment vessel. Superheated steam located in the pressure chamber in the event of an accident passes through that flow path together with the noncondensible gases into the condenser. The steam is cooled down and condensed there by heat emission to the cooling basin. A mixture of liquid and noncondensible gases therefore forms in the condenser. The mixture is passed back into the containment vessel again in order to ensure that no radioactivity can pass into the environment. A gas/liquid separation device is generally provided in order to separate off the noncondensible gases. The latter are directed into the condensing chamber and trapped there so that they cannot escape again into the pressure chamber. The liquid is optionally used for cooling the reactor pressure vessel or is likewise directed into the condensing chamber. To that end, control valves in appropriate pipelines are often used. That concept or comparable concepts for heat dissipation in the event of an accident are described, for example, in U.S. Pat. No. 5,102,617, U.S. Pat. No. 5,149,492, U.S. Pat. No. 5,570,401 and European Patent Applications 0 681 300 A1 and 0 620 560 A1. A common feature of all of the known concepts is that the steam to be cooled down is directed together with the noncondensible gases into the condenser.

It is known from European Patent Application 0 492 899 A1 to provide a flow path between the condensing chamber and the pressure chamber. The flow path is automatically opened from a certain pressure difference between those two chambers in order to direct superheated steam into the condensing chamber for dissipating the heat and reducing the pressure in the event of an accident. The flow path is constructed as a U-shaped pipe, which may be referred to as a condensing pipe. Two legs of the U-shaped pipe are disposed with their respective openings inside the pressure chamber or inside the condensing chamber. Liquid is located in a U-shaped or siphon-like bend, so that the flow path formed by the U-shaped pipe is closed as long as the pressure in the pressure chamber is not substantially higher than that in the condensing chamber.

SUMMARY OF THE INVENTION

It is accordingly an object of the invention to provide a containment vessel of a nuclear power plant having a condenser, and a method of operating a condenser in a nuclear power plant, which overcome the hereinafore-mentioned disadvantages of the heretofore-known devices and methods of this general type and in which an efficiency of the condenser is largely unaffected by noncondensible gases.

With the foregoing and other objects in view there is provided, in accordance with the invention, a containment vessel of a nuclear power plant, comprising an interior space; a condensing chamber disposed in the interior space; a pressure chamber disposed in the interior space, the pressure chamber having a top region; a condenser communicating with the pressure chamber through a flow path; and a drain pipe for noncondensible gases, the drain pipe disposed in the interior space and fluidically connecting the top region of the pressure chamber to the condensing chamber.

With the objects of the invention in view, there is also provided a containment vessel of a nuclear power plant, comprising an interior space; a condensing chamber disposed in the interior space; a pressure chamber disposed in the interior space; a condenser disposed in the pressure chamber and defining a region around the condenser; and a drain pipe for noncondensible gases, the drain pipe fluidically connecting the region around the condenser to the condensing chamber, and the drain pipe having a top end disposed above the condenser.

The two embodiments are based on the common inventive concept of ensuring a high efficiency of the condenser by preventing noncondensible gases from coming into contact with the condenser in too high a concentration. In principle, the condenser may be disposed both inside and outside the pressure chamber. If it is disposed outside the pressure chamber, superheated steam is directed to it through a flow path from the top region of the pressure chamber. In the first embodiment, the noncondensible gases are drawn off beforehand from the top region of the pressure chamber through the drain pipe into the condensing chamber. In the case of a condenser disposed inside the pressure chamber, provision is made in the second embodiment for the noncondensible gases to be drawn off directly from the surroundings of the condenser through the use of the drain pipe. In this case, the condenser is disposed in particular in the top region of the pressure chamber.

A common feature of both embodiments is the fact that the drain pipe is constructed as a simple pipe and is disposed completely inside the containment vessel. An immediate and direct connection is made between the pressure chamber and the condensing chamber by the drain pipe. In particular, no further components are connected in the flow path formed by the drain pipe.

Therefore, the noncondensible gases are drawn off into the condensing chamber in an expedient and direct manner in both embodiments due to the configuration of the drain pipe. The condensing chamber is filled up to a filling level with a cooling liquid, which forms a so-called water receiver.

The noncondensible gases are, for example, hydrogen or inert gases, such as air or nitrogen. Air or nitrogen mixes comparatively easily with the steam in the region of the condenser. As a result, the capacity of the condenser to dissipate heat may be substantially impaired. Due to the fact that less heat is then dissipated, the pressure in the pressure chamber increases, specifically until the steam/inert-gas mixture flows over automatically into the condensing chamber through the drain pipe. The steam condenses there in the water receiver and the noncondensible gases remain behind in the gas space of the condensing chamber. The steam/inert-gas mixture flows into the condensing chamber until the concentration of the noncondensible gases has been reduced to such an extent that the condenser can again dissipate all of the heat being supplied.

If hydrogen is present, it collects in the top region of the pressure chamber due to its low specific weight. If a large quantity of hydrogen is present, the condenser is surrounded by hydrogen. The efficiency of the condenser is then substantially impaired and the condenser dissipates little heat. As a result, inert gases appear to a comparable degree to increase the pressure in the pressure chamber and virtually pure hydrogen flows over into the condensing chamber. In this way, a large part of the hydrogen is directed into the condensing chamber. After hydrogen has flown off, the condenser is again mainly surrounded by steam and can readily dissipate the heat of the steam.

The noncondensible gases remain in the condensing chamber, which is largely closed off from the pressure chamber, and cannot escape into the pressure chamber. The concentration of noncondensible gases in the region of the condenser therefore remains small. It is thus ensured that the mode of operation of the condenser is largely unaffected by the noncondensible gases.

An essential advantage of the configuration of the drain pipe is the fact that the condenser may have a simple structure. In particular, it is sufficient to construct its heat-exchange capacity for virtually pure saturated steam. The heat-exchanging surface of the condenser may thus be constructed to be simpler and smaller than would be the case if there were no drain pipe. As a rule, the heat-exchanging areas are tubes, which are packed to form compact heat-exchanger bundles.

A further advantage is that the entire gas space of the condensing chamber is available for storing the hydrogen being released, for example in the event of an accident. In the event of an accident, the pressure increase in the containment vessel is therefore smaller than if there were no possibility of the hydrogen flowing over through the drain pipe.

The top end of the drain pipe is preferably disposed above the condenser, so that hydrogen, which collects in the topmost region of the pressure chamber above the condenser due to its low specific weight, can be drawn off in an expedient manner.

In accordance with another feature of the invention, in order to permit an especially simple construction of the drain pipe and a maintenance-free and reliable operation of the drain pipe, the drain pipe preferably forms a permanently open flow path. Thus no valves, slides or similar shut-off mechanisms are provided in the drain pipe.

In accordance with a further feature of the invention, the bottom end of the drain pipe is immersed in the cooling liquid of the condensing chamber. As a result, steam which is directed with the noncondensible gases through the drain pipe into the condensing chamber condenses directly upon being introduced into the condensing chamber.

In accordance with an added feature of the invention, the bottom end of the drain pipe discharges into the cooling liquid above a lower end of a condensing pipe which is run, for example, from the pressure chamber into the condensing chamber. Such condensing pipes are provided in order to direct large steam quantities from the pressure chamber into the condensing chamber and to condense them there, so that the pressure in the pressure chamber and thus in the containment vessel is reduced. The condensing pipe is accordingly immersed deeper in the cooling liquid of the condensing chamber than the drain pipe, and there is a smaller water column in the drain pipe than in the condensing pipe. The effect of the smaller immersion depth of the drain pipe is that, in the event of minor accidents with little escape of steam, steam is transferred into the condensing chamber merely through the drain pipe, while the substantially larger condensing pipes remain closed by water plugs.

In accordance with an additional feature of the invention, the condenser is fluidically connected to an external cooling basin. Such a condenser is also referred to as a building condenser. It can dissipate the heat from the containment vessel into the surroundings of the containment vessel. In this case, the cooling basin is disposed on the containment vessel, in particular outside the same.

With the objects of the invention in view, there is additionally provided a method of operating a condenser in a nuclear power plant, which comprises automatically drawing off noncondensible gases from a region above the condenser, so that the efficiency of the condenser is largely unaffected by noncondensible gases.

Other features which are considered as characteristic for the invention are set forth in the appended claims.

Although the invention is illustrated and described herein as embodied in a containment vessel and a method of operating a condenser in a nuclear power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a greatly simplified, diagrammatic, sectional view through a containment vessel of a boiling-water-reactor nuclear power plant with a cooling basin disposed above it.

DESCRIPTION OF THE PREFERRED EMBODIMENTS

Referring now in detail to the single FIGURE of the drawing, there is seen a reactor pressure vessel 2 which is disposed centrally in a closed containment vessel 1, that is also merely referred to as a containment. A condensing chamber 4 and a flood basin 8 disposed above it are provided laterally next to the reactor pressure vessel 2, as further built-in components in the containment vessel 1. The flood basin 8 is open at the top toward an interior space of the containment vessel 1. The interior space is also designated as a pressure chamber 6. The latter forms a common pressure space with the flood basin 8.

The condensing chamber 4 and the flood basin 8 are each partly filled with a cooling liquid f, in particular water, up to a filling level n. The maximum filling level n in the flood basin 8 is determined by a top end of an overflow pipe 10. The overflow pipe 10 connects the flood basin 8 to the condensing chamber 4 and discharges into the cooling liquid f of the condensing chamber 4. If the maximum filling level n is exceeded, the cooling liquid f flows off from the flood basin 8 into the condensing chamber 4. Furthermore, the flood basin 8 is connected through a flood line 12 to the reactor pressure vessel 2 and can supply the latter with sufficient cooling liquid f in an emergency.

The condensing chamber 4 is largely closed off from the pressure chamber 6. It is merely connected to the pressure chamber 6 through a condensing pipe 14. The condensing pipe 14 is immersed in the cooling liquid f of the condensing chamber 4, so that no gas exchange takes place between the condensing chamber 4 and the pressure chamber 6. The condensing pipe 14 is closed by a water plug 15, which is formed by a water column in the condensing pipe 14. Steam only flows into the condensing chamber 4 through the condensing pipe 14 for condensing in the event of an accident, if the pressure in the pressure chamber 6 increases.

A condenser 16, which is designated as a building condenser, is disposed in a top region of the containment vessel 1 and thus in a top region of the pressure chamber 6, in the left-hand half of the FIGURE. The condenser 16 is constructed as a heat exchanger with heat-exchanger tubes and is fluidically connected to a cooling basin 18. In principle, the condenser 16 may also be disposed outside the containment vessel 1 in this cooling basin 18 and may be connected through pipelines to the interior space of the containment vessel, in particular to the pressure chamber 6. The cooling basin 18 is disposed outside the containment vessel 1 on a cover 20 thereof. The condenser 16 absorbs heat from its surroundings inside the containment vessel 1 and transfers it to the cooling basin 18. As a result, heat can be dissipated from the containment vessel 1 to the external surroundings.

A drain pipe 22 is preferably disposed in the region of the condenser 16. It is important that its top end 24 is disposed in the top region of the pressure chamber 6 and in particular at a level above the condenser 16. Its bottom end 26 discharges into the cooling liquid f of the condensing chamber 4. The drain pipe 22 is constructed as a simple pipe which is free of built-in components and forms an open flow path from the pressure chamber 6 into the cooling liquid f of the condensing chamber 4. In this case, "free of built-in components" means that no valves or other fittings or components are connected in the flow path.

In this case, the immersion depth of the drain pipe 22 in the cooling liquid f is smaller than that of the overflow pipe 10 and that of the condensing pipe 14, which has a substantially larger cross-sectional area than the drain pipe 22. The bottom end 26 of the drain pipe 22 is therefore disposed above respective outlet orifices 28 of the condensing pipe 14 and the overflow pipe 10.

In the event of an accident, for example in the event of a fracture in a steam line in the containment vessel 1 and an escape of steam associated therewith, the temperature and the pressure in the containment vessel 1 increase. Various emergency cooling devices, of which only the condenser 16 and the flood basin 8 with the associated flood line 12 are shown in the FIGURE, ensure that the final pressure in the event of an accident in the containment vessel 1 does not exceed an admissible limit value. This is primarily achieved by cooling and condensing of the steam. An important factor in this case is the condenser 16, with which heat can be dissipated to the outside from the containment vessel 1.

In the course of an accident, noncondensible gases, in particular hydrogen, will possibly be released, and these noncondensible gases accumulate in the top region of the containment vessel 1, i.e. in the top region of the pressure chamber 6. The noncondensible gases which collect in the top region of the pressure chamber 6 lead to an increase in the pressure in the containment vessel 1. Due to the configuration of the drain pipe 22 and the increased pressure in the region of the top end 24, the mixture of steam and noncondensible gases there flows off through the drain pipe 22 from the top region of the pressure chamber 6 into the condensing chamber 4. The entrained steam is condensed in the condensing chamber 4. Therefore, by virtue of the drain pipe 22, an accumulation of noncondensible gases, for which the entire gas space in the condensing chamber 4 is available, is avoided in the region around the condenser 16.

In principle, the noncondensible gases impair the efficiency of the condenser 16 by virtue of the fact that they substantially reduce the heat exchange capacity of the condenser 16. When noncondensible gases are present, substantially less heat per unit of time and per unit of area can be dissipated from the steam to the cooling basin 18 by the heat exchanger 16 than when noncondensible gases are absent. Since the latter are drawn off from the surroundings of the condenser 16, the condenser 16 can be constructed for saturated steam. The condenser 16 therefore does not need to have any large and specially constructed heat-exchange areas, which would be absolutely necessary if noncondensible gases were present in order to be able to dissipate sufficient heat. The condenser 16 may therefore have a simple, compact and thus cost-effective construction.

Due to the smaller immersion depth of the drain pipe 22 as compared with that of the condensing pipe 14, steam will flow out of the pressure chamber 6 into the condensing chamber 4 solely through the drain pipe 22 as long as there is only a low positive pressure in the pressure chamber 6 relative to the pressure in the condensing chamber 4. Steam can only flow through the condensing pipe 14 into the condensing chamber 4 at greater pressure differences between the pressure chamber 6 and the condensing chamber 4, which only occur briefly in exceptional cases. The condensing pipe 14 has a large cross section of flow and therefore enables very large steam quantities to be directed for condensing into the condensing chamber 4 in the shortest possible time.

According to the present novel concept, in a containment vessel 1 with a condenser 16, noncondensible gases are automatically drawn off from the active region of the condenser 16 into the condensing chamber 4 through a flow path. In this case, the flow path is formed by a simple drain pipe 22. The mode of operation of the drain pipe 22 is purely passive, thus no external control actions are necessary. The drain pipe 22 also requires no movable components and is therefore maintenance-free. The reliability of performance of the condenser 16 is ensured by the configuration of the drain pipe 22, so that the condenser 16 may have a simple structure.

I claim:

1. A containment vessel of a nuclear power plant, comprising:
   an interior space;
   a condensing chamber disposed in said interior space, said condensing chamber being filled to a filling level with a cooling liquid;
   a pressure chamber disposed in said interior space, said pressure chamber having a top region;
   a condenser disposed in said interior space;
   a condensing pipe leading into said condensing chamber for enabling overflow of vapor into said condensing chamber from outside said condensing chamber; and
   a drain pipe for noncondensible gases, said drain pipe disposed in said interior space and fluidically connecting said top region of said pressure chamber to said condensing chamber, said drain pipe defining a direct connection to said condensing chamber, and said drain pipe not connected to said condenser, said drain pipe having an upper end disposed at a level above said condenser and a bottom end immersed into said cooling liquid;
   said condenser and said upper end of said drain pipe being disposed in said pressure chamber, and said upper end of said drain pipe being disposed to permit the noncondensible gases to be led off from atmosphere surrounding said condenser and thermally interacting with said condenser.

2. A containment vessel of a nuclear power plant, comprising:
   an interior space;
   a condensing chamber disposed in said interior space, said condensing chamber being filled to a filling level with a cooling liquid;
   a pressure chamber disposed in said interior space;
   a condenser disposed in said pressure chamber;
   a region around said condenser;
   a condensing pipe leading into said condensing chamber for enabling overflow of vapor into said condensing chamber from outside said condensing chamber; and
   a drain pipe for noncondensible gases, said drain pipe fluidically connecting said region around said condenser to said condensing chamber, and said drain pipe having a top end disposed above said condenser, and said drain pipe defining a direct connection to said condensing chamber, and said drain pipe not connected to said condenser, said drain pipe having an upper end disposed at a level above said condenser and a bottom end immersed into said cooling liquid;
   said condenser and said upper end of said drain pipe being disposed in said pressure chamber, and said upper end of said drain pipe being disposed to permit the noncondensible gases to be drawn off from atmosphere surrounding said condenser and thermally interacting with said condenser.

3. The containment vessel according to claim 1, wherein said drain pipe forms a permanently open flow path.

4. The containment vessel according to claim 2, wherein said drain pipe forms a permanently open flow path.

5. The containment vessel according to claim 1, wherein said condensing pipe ends below said bottom end of said drain pipe.

6. The containment vessel according to claim 2, wherein said condensing pipe ends below said bottom end of said drain pipe.

7. The containment vessel according to claim 1, including an external cooling basin, said condenser fluidically communicating with said external cooling basin.

8. The containment vessel according to claim 2, including an external cooling basin, said condenser fluidically communicating with said external cooling basin.

9. The containment vessel according to claim 1, wherein said drain pipe has a bottom end, and said condensing chamber contains a cooling liquid in which said bottom end of said drain pipe is immersed.

10. The containment vessel according to claim 2, wherein said drain pipe has a bottom end, and said condensing chamber contains a cooling liquid In which said bottom end of said drain pipe is immersed.

* * * * *